United States Patent
Goodhall et al.

(10) Patent No.: US 9,919,626 B2
(45) Date of Patent: Mar. 20, 2018

(54) FOLDING AND RECLINING REAR SEAT SYSTEM

(71) Applicant: Ford Global Technologies, LLC, Dearborn, MI (US)

(72) Inventors: Shane A. Goodhall, Ypsilanti, MI (US); Henry W. Hausler, Manchester, MI (US); Curtis Stanhope, Pickney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/207,978

(22) Filed: Jul. 12, 2016

(65) Prior Publication Data
US 2018/0015851 A1    Jan. 18, 2018

(51) Int. Cl.
*B60N 2/22* (2006.01)
*B60N 2/30* (2006.01)
*B60N 2/02* (2006.01)

(52) U.S. Cl.
CPC ............ *B60N 2/2209* (2013.01); *B60N 2/02* (2013.01); *B60N 2/309* (2013.01); *B60N 2/3031* (2013.01); *B60N 2/3065* (2013.01)

(58) Field of Classification Search
CPC . B60N 2/005; B60N 2/02; B60N 2/22; B60N 2/2209; B60N 2/30; B60N 2/3002;
(Continued)

(56) References Cited

U.S. PATENT DOCUMENTS

| 1,888,787 A | * | 11/1932 | Carlson | B60N 2/2209 296/65.13 |
| 2,229,608 A | * | 1/1941 | Ragsdale | B61D 31/00 105/315 |

(Continued)

FOREIGN PATENT DOCUMENTS

| EP | 0211248 A2 | * | 2/1987 | ........... B60N 2/0284 |
| FR | 2285260 A1 | * | 4/1976 | ........... B60N 2/2209 |
| FR | 2524285 A1 | * | 10/1983 | ........... B60N 2/2209 |

OTHER PUBLICATIONS

English translation of FR 2524285; retrieved via PatentTranslate located at www.epo.org. (Year: 2017).*

(Continued)

*Primary Examiner* — Jason S Daniels
(74) *Attorney, Agent, or Firm* — Vichit Chea; Price Heneveld LLP

(57) ABSTRACT

A reclining seat includes a seat base coupled to a support surface. The seat base is moveable between extended and retracted positions as supported on a support roller by a guide rail disposed on an underside of the seat base. The guide rail includes a first support surface disposed at a first height, and a second support surface is disposed at a second height that is greater than the first height of the first support surface with a ramped portion disposed therebetween. The seat base is supported at the first support surface in the retracted position, and supported at the second support surface in the extended position. A seatback is coupled to a rear wall and is operable between upright and reclined positions. In the reclined position, the seatback is moved downward and away from the rear wall.

19 Claims, 9 Drawing Sheets

(58) Field of Classification Search
CPC .... B60N 2/302; B60N 2/3029; B60N 2/3031;
B60N 2/3056; B60N 2/3068
USPC ................. 296/65.01, 65.09, 65.16; 297/317
See application file for complete search history.

(56) References Cited

U.S. PATENT DOCUMENTS

| | | | |
|---|---|---|---|
| 4,518,201 A * | 5/1985 | Wahlmann | B60N 2/2209 296/65.09 |
| 5,029,928 A | 7/1991 | Huber | |
| 5,671,948 A | 9/1997 | Susko et al. | |
| 6,883,854 B2 | 4/2005 | Daniel | |
| 7,559,594 B2 | 7/2009 | McMillen | |
| 7,568,764 B2 | 8/2009 | Harper et al. | |
| 7,611,200 B2 | 11/2009 | Jovicevic et al. | |
| 8,408,648 B2 | 4/2013 | Champ | |
| 8,662,561 B2 | 3/2014 | Runde et al. | |
| 8,899,684 B2 | 12/2014 | Seibold | |
| 9,193,281 B2 | 11/2015 | Elton | |
| 2008/0100112 A1 | 5/2008 | Hausler et al. | |
| 2014/0306479 A1 | 10/2014 | Abe et al. | |

OTHER PUBLICATIONS

English translation of FR 2285260; retrieved via PatentTranslate located at www.epo.org. (Year: 2017).*

* cited by examiner

FOLDING AND RECLINING REAR SEAT SYSTEM

FIELD OF THE INVENTION

The present invention generally relates to a seat for use in a motor vehicle, and more particularly, to a rear seat having reclining and folding capabilities to optimize passenger comfort and cargo storage.

BACKGROUND OF THE INVENTION

Increased comfort for rear seat passengers can be a challenge with specific regard to rear seats disposed in pick-up trucks. Particularly, the rear wall of a pick-up truck cabin can prevent a rear seat from reclining to a desired position for increasing the comfort for a rear seat passenger. Further, the rear seats in pick-up trucks are generally foldable to increase the amount of cargo space in the cabin, such that a desire exists to provide an adjustable rear seat that can recline and fold to optimize cargo space and provide comfort options for a rear seat passenger.

SUMMARY OF THE INVENTION

One aspect of the present invention includes a reclining seat having a seat base coupled to a support surface by one or more upstanding brackets. The seat base is moveable between fore and aft positions on the one or more upstanding brackets. A seatback is coupled to a rear wall that is disposed substantially perpendicular to the support surface. The seatback includes at least one upper guide pin member disposed in a guide slot of an upper bracket that is coupled to the rear wall. A lower portion of the seatback includes at least one lower guide pin that is coupled to a guide slot disposed on the one or more upstanding brackets. The seatback is operable between upright and reclined positions.

Another aspect of the present invention includes a reclining seat having a seat base with a guide rail disposed on an underside of the seat base. An upright bracket system includes a support roller that contacts the guide rail to support the seat base between extended and retracted positions. The seatback is moved to a reclined position when the seat base is moved to the extended position.

Yet another aspect of the present invention includes a reclining seat having a seat base supported on a support roller between fore and aft positions along a guide rail of the seat base. The guide rail includes first and second support surfaces with the first support surface disposed at a first height and the second support surface disposed at a second height that is greater than the first height of the first support surface. A seatback is coupled to the seat base and operable between upright and reclined positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
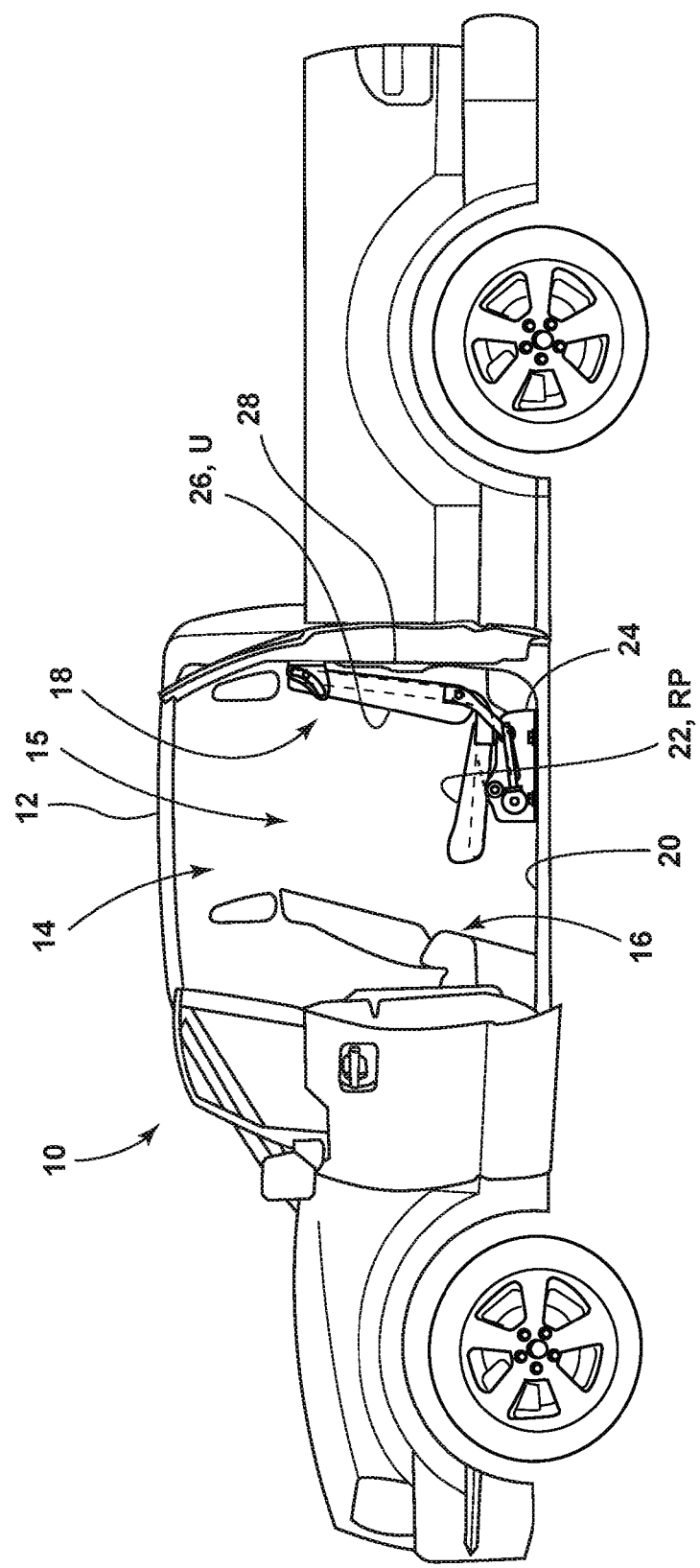
FIG. 1A is a side elevational view of a motor vehicle having a rear seat according to one embodiment of the present invention.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a pick-up truck 10 is shown having an extended cab 12. The pick-up truck 10 provided in this disclosure is for establishing an environment for a reclining rear seat as further described below. The pick-up truck 10 is not meant to limit the invention in any manner, and the rear seat assembly of the present invention may be used in any environment where adjustability is desired and space is limited, including applications outside of a motor vehicle.

The pick-up truck 10 includes a vehicle interior 14 defined by the extended cab 12 that includes a front seat 16 and a rear seat 18 both supported on a vehicle floor or support surface 20. The rear seat 18 includes a seat base 22 that is disposed on an upright support bracket 24. The seat base 22 is pivotally coupled to a seatback 26 which is disposed in an upright position U. The seat base 22 is shown in a retracted position RP and is further shown in a use position UP, wherein the seat base 22 is configured to receive and support a vehicle occupant. The vehicle interior 14 includes a cargo space 15 that is premium space in which the rear seat 18 is disposed. Thus, it is a desire of the present invention to provide a rear seat 18 having a small footprint within the cargo space 15, while still allowing for adjustability of the rear seat 18 as further described below. The seatback 26 is coupled to a rear wall 28 of the extended cab 12 of the pick-up truck 10, and the rear wall 28 is shown disposed in a substantially perpendicular configuration relative to the support surface 20 of the pick-up truck 10.

As used throughout this disclosure, the term "seat base" is intended to refer to a portion of a seat that is used to support a vehicle passenger generally at the buttocks and thighs of the vehicle passenger. The seat base 22 may include a frame and an upper cushioned portion which are contemplated to be integral parts of the seat base 22 described in the present disclosure. Similarly, the seatback 26 is configured to support a rear passenger at a back portion thereof, such that the term "seatback" may refer to a seatback frame and cushion portion as a complimentary support piece to the seat base 22.

Figure 1B:
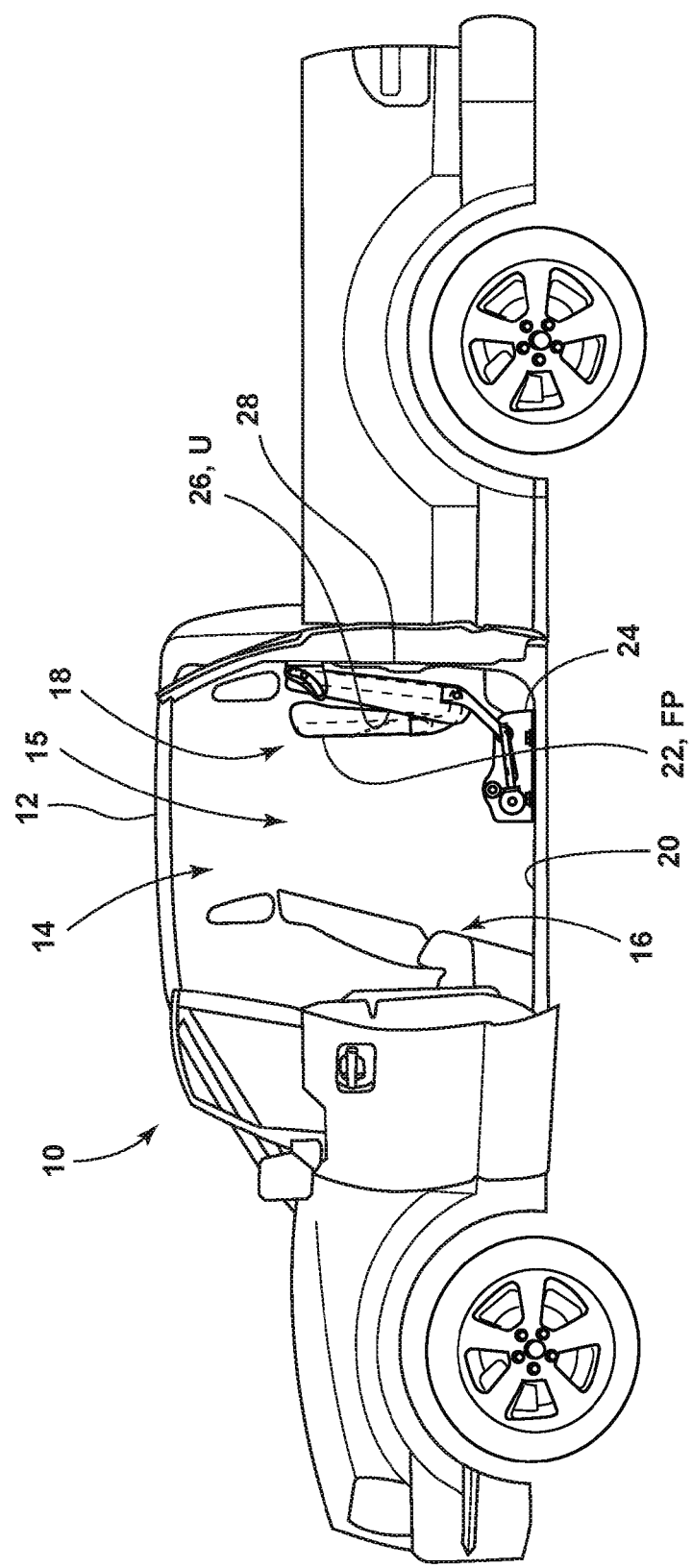
FIG. 1B is a side view of the pick-up truck and rear seat of FIG. 1A with the rear seat in a folded position.

Referring now to FIG. 1B, the seat base 22 is shown in a folded position FP which is contemplated to maximize the cargo space 15 of the extended cab 12 of the pick-up truck 10. In moving from the use position UP shown in FIG. 1A to the folded position FP shown in FIG. 1B, the seat base 22 is rotated upwards in a direction as indicated by arrow 31 in FIG. 7.

Figure 2:
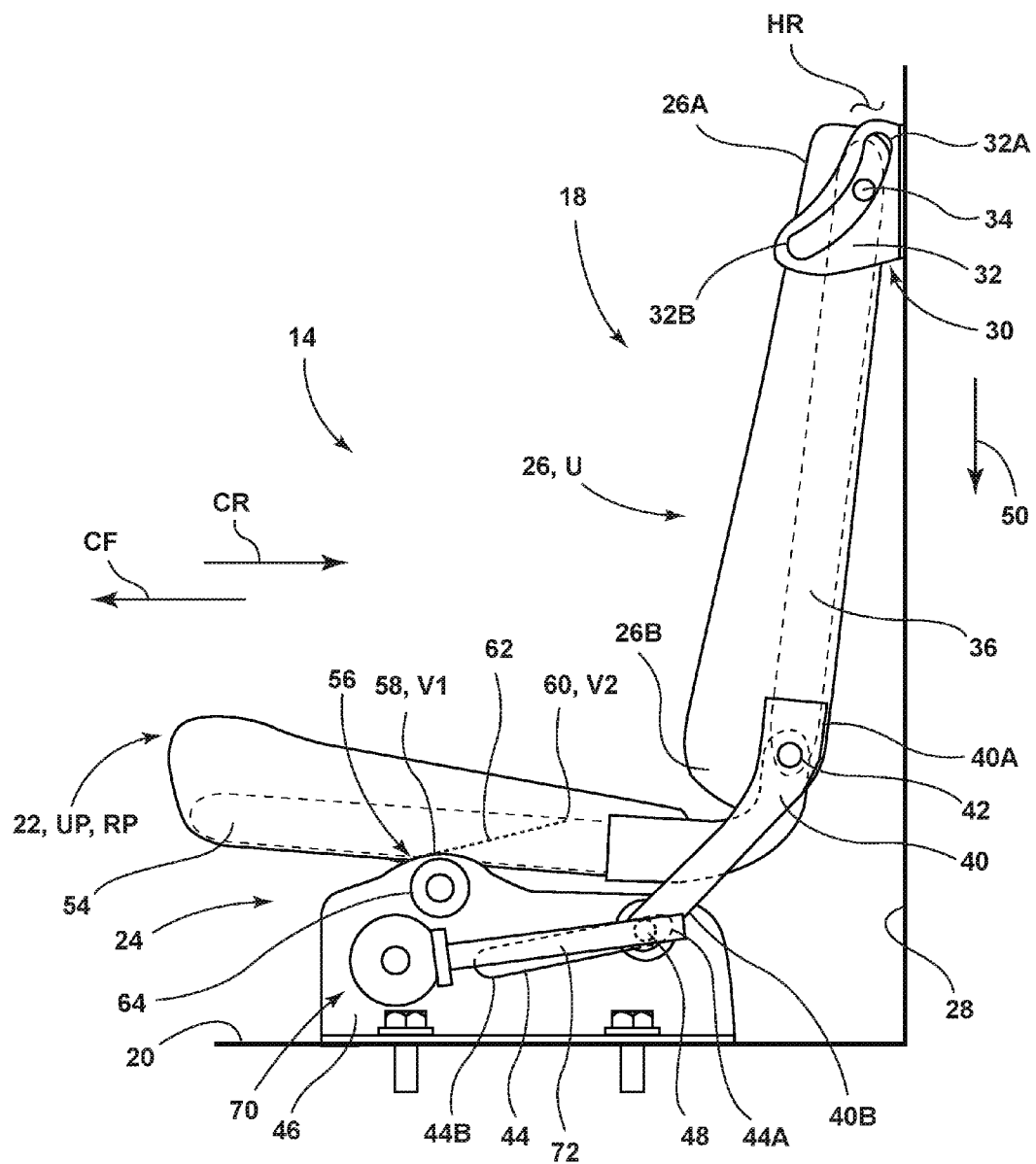
FIG. 2 is a side elevational view of the rear seat of FIG. 1A in an upright use position.

Referring now to FIG. 2, the seat base 22 is shown in a use position UP as opposed to the folded position FP shown in FIG. 1B. Further, the seat base 22 is shown in a retracted position RP or aft position, wherein the seat base 22 is disposed in a car-rearward direction indicated by arrow CR. For the purposes of this disclosure, the terms "car-rearward" and "car-forward" will refer to positions of various parts of the rear seat 18 as configured within the vehicle interior 14. For instance, the seat base 22 is shown in the retracted position RP in FIG. 2, and further shown in an extended position EP in FIG. 3. In moving from the retracted position RP of FIG. 2 to the extended position EP in FIG. 3, the seat base 22 has moved in the car-forward direction along the path as indicated by arrow CF.

Figure 3:
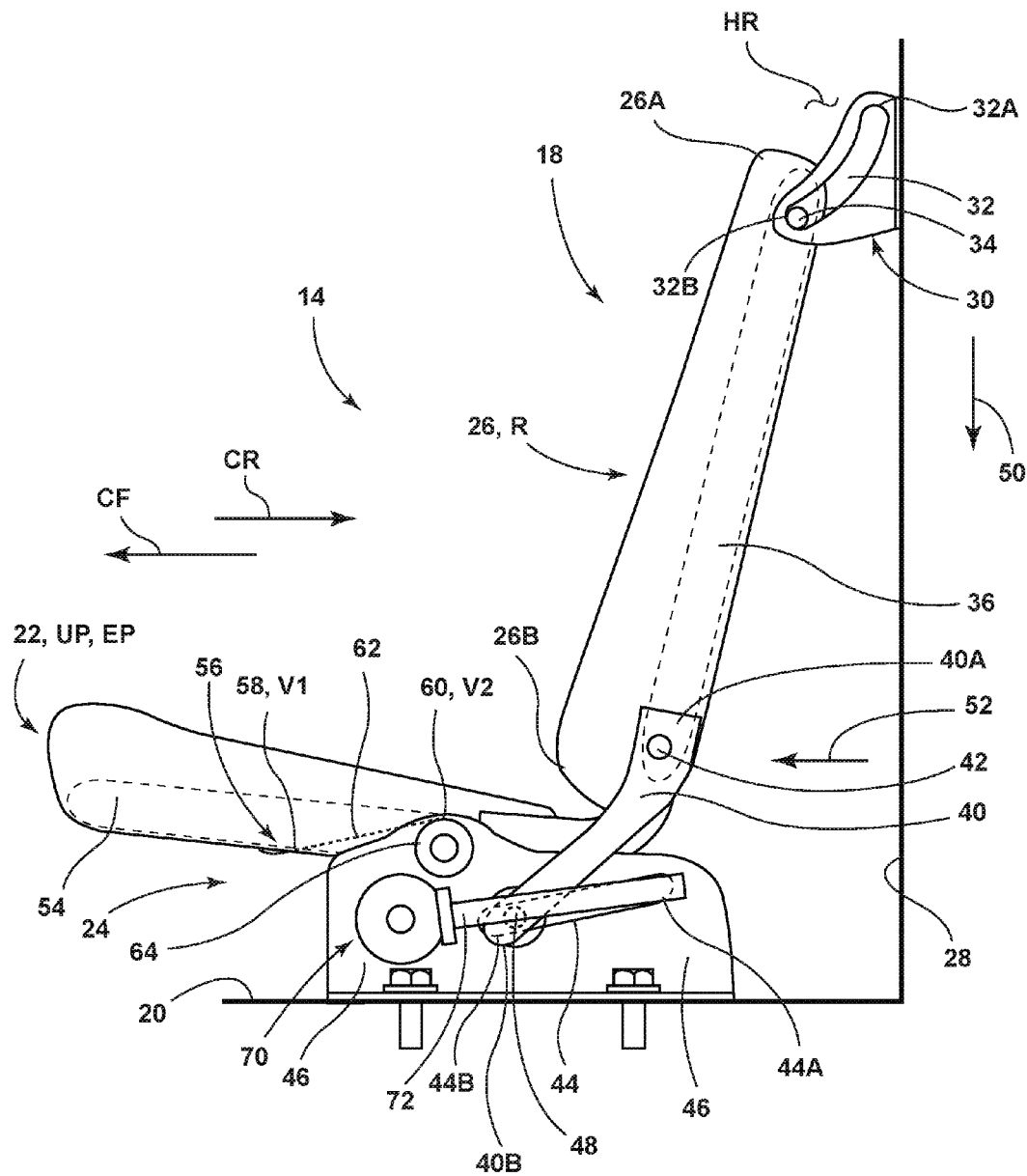
FIG. 3 is a side elevational view of the rear seat of FIG. 2 in an reclined position.

With reference to FIGS. 2 and 3, the seat base 22 is operable between extended and retracted positions EP, RP within the vehicle interior 14. The seat base 22 is also operable between use positions UP (shown in FIGS. 2 and 3) and a folded position FP as shown in FIG. 1B. In this way, the seat base 22 of the rear seat 18 provides adjustability for various comfort settings for a rear passenger, while also providing options for maximizing the cargo space 15 within the vehicle interior 14 as shown in FIG. 1B.

With further reference to FIGS. 2 and 3, the seatback 26 is shown in the upright position U (FIG. 2) and further shown in a reclined position R (FIG. 3). Thus, the rear seat 18 is a reclining rear seat, wherein the seatback 26 is coupled to the rear wall 28 at an upper bracket 30. As specifically shown in FIG. 1, the upper bracket 30 includes a guide slot 32 having first and second ends 32A, 32B. The guide slot 32 includes a downwardly and outwardly curved configuration from first end 32A to second end 32B in a car-forward direction as indicated by arrow CF. A guide pin 34 is disposed within the guide slot 32 and retained therein for guiding movement of the seatback 26 between the upright position U and the reclined position R. The guide pin 34 is contemplated to be an outwardly extending guide pin disposed at an upper portion 26A of the seatback 26. While the embodiment shown in FIG. 2 generally shows a left side of the seatback 26, it is contemplated that the right side of the seatback 26 may also include an upper bracket similar to upper bracket 30, such that movement of the seatback 26 is consistent and guide pins, such as guide pin 34, remain contained within the respective guide slots, such as guide slot 32 shown in FIG. 2. The upper bracket 30 is coupled to the rear wall 28, which is a substantially perpendicular wall relative to the support surface 20 within the vehicle interior 14. It is rear wall 28 that generally inhibits a rear seat from having the ability to recline, as a seatback generally cannot recline at the upper portion thereof due to the proximity of the rear wall 28. Thus, in the present invention, the seatback 26 slides downward and forward along the guide slot 32 of the upper bracket 30 to provide a reclined position R of the seatback 26 shown in FIG. 3. As further shown in FIG. 3, the guide pin 34 has moved downward and outward along the guide slot 32 from the first end 32A towards the second end 32B of the guide slot 32 in translating the seatback 26 to the reclined position R. The guide pin 34 is contemplated to be coupled to a seatback frame 36 shown in phantom in FIGS. 2 and 3.

Figure 5:
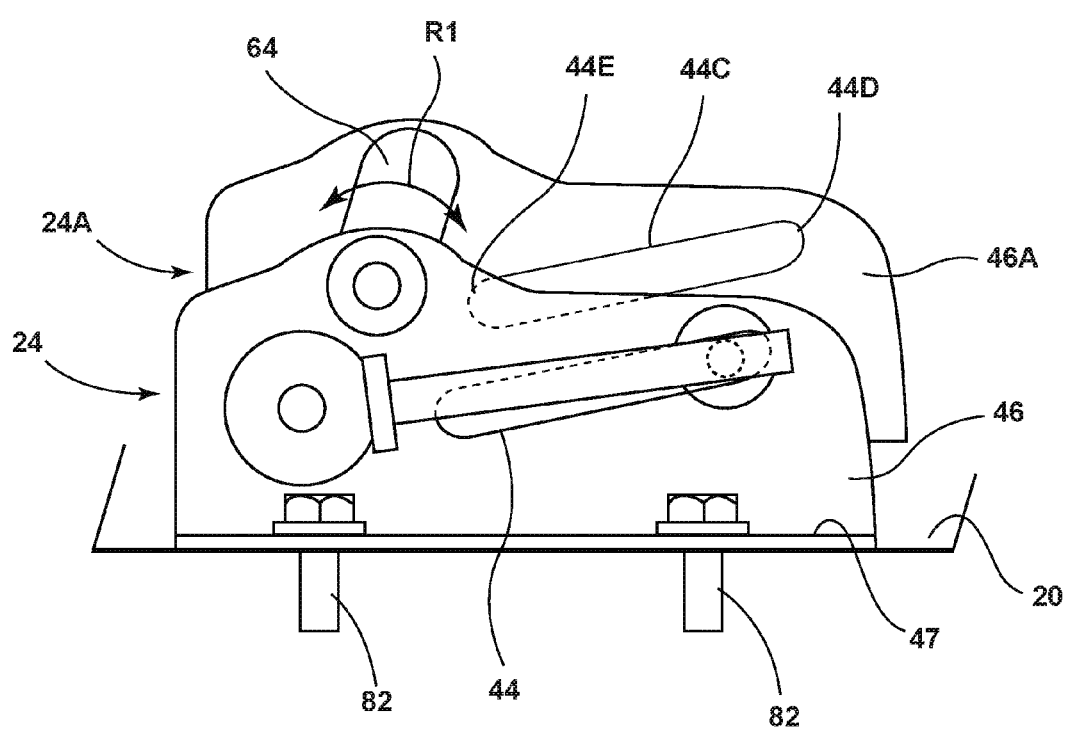
FIG. 5 is a top perspective view of an upstanding support bracket system.

As further shown in FIG. 2, a lower portion 26B of the seatback 26 includes a lower bracket 40 having an upper end 40A that is coupled to the seatback frame 36 at pivot point 42. A second end 40B is coupled to a guide slot 44 disposed in an upstanding body portion 46 of the support bracket 24. In a similar manner as discussed above with reference to upper bracket 30, it is contemplated that the lower bracket 40 and support bracket 24 may be disposed on the rear seat 18 in pairs on either side of the rear seat 18 as best shown in FIG. 5. As further shown in FIG. 2, a guide pin 48 is received in the guide slot 44 of the support bracket 24. The guide slot 44 includes a first end 44A and a second end 44B, wherein the guide slot includes a downwardly angled configuration from the first end 44A to the second end 44B in a car-forward direction as indicated by arrow CF. Thus, as the seatback 26 moves to the reclined position R, shown in FIG. 3, the guide pin 48 moves within the guide slot 44 from the first end 44A at a downward angle towards the second end 44B. This movement from the upright position U to the reclined position R moves the seatback 26 in a downward direction as indicated by arrow 50 and away from the rear wall 28 in an outward direction as indicated by arrow 52. Thus, in FIG. 3, the upper portion 26A and the lower portion 26B of the seatback 26 are moved downward and away from the rear wall 28 to provide a reclined position R of the seatback 26. This movement downward and away from the rear wall 28 provides an angled position of the seatback 26, such that a vehicle occupant seated in the rear seat 18 will have a torso angle that reclines without the need to tilt their head forward in a manner that could cause passenger discomfort. Specifically, with the upper portion 26A of the seatback 26 being moved away from the rear wall 28, there is ample headroom HR above the upper portion 26A of the seatback 26 for a vehicle occupant's head to be disposed without contacting the rear wall 28, as further described below.

Referring again to FIG. 2, the seat base 22 includes a seat base frame 54 having a guide rail 56 disposed therein. The guide rail 56 includes a first support surface 58 and a second support surface 60 having an inclined ramped portion 62 disposed therebetween. In the embodiment shown in FIG. 2, the first support surface 58 is disposed at a first vertical height V1 while the second support surface 60 is disposed at a second vertical height V2. The second vertical height V2 is greater than the first vertical height V1, such that the ramped portion 62 disposed between the first support surface 58 and the second support surface 60 is an upwardly inclined ramped portion 62 as viewed from first support surface 58 to second support surface 60 in a car-rearward direction as indicated by arrow CR. As such, the guide rail 56 provides for movement of the seat base 22 between the retracted position RP (FIG. 2) to the extended position EP (FIG. 3) with minimal seat angle variance.

As further shown in FIG. 2, the guide rail 56 is disposed on a lower portion or underside of the seat base 22 for abutting contact with a support roller 64 disposed on the upstanding portion 46 of the support bracket 24. The support roller 64 is contemplated to be a rotating part that allows the seat base 22 to move between the retracted positon RP and the extended position EP. When the seat base 22 is in the retracted position RP, as shown in FIG. 2, the support roller 64 is in contact with the first support surface 58 of the guide rail 56. When the seat base 22 is moved to the extended position EP, as shown in FIG. 2, the support roller 64 is in abutting contact with the second support surface 60 of the guide rail 56, having the ramped portion 62 rolled along the support roller 64 from the first support surface 58 to the second support surface 60. In this way, the seat base 22 is moved downward in the direction as indicated by arrow 50 and outward in the direction as indicated by arrow 52 when moving from the retracted position RP to the extended position EP. The guide rail 56 is contemplated to be a smooth and continuous guide rail from first support surface 58 to second support surface 60 along the ramped portion 62 to provide for smooth and continuous movement of the seat base 22 between the retracted position RP and the extended position EP. Movement of the rear seat 18 to the reclined position is contemplated to be provided by a drive mechanism 70 that includes a drive shaft 72 which is coupled to the guide pin 48 of lower bracket 40. The connection between the guide pin 48 and the drive shaft 72 can be achieved any number of connections known in the art, such as a ferrule connection along a threaded portion of the drive shaft 72 that is rotated by the drive mechanism 70. In this way, the drive mechanism 70 can rotate the drive shaft 72 to move the guide pin 48 from the first end 44A of the guide slot 44, towards the second end 44B of the guide slot 44. Movement of the guide pin 48 along the guide slot 44 from the first end 44A to the second end 44B is shown in FIGS. 2 and 3. This driving action moves the seat base 22 from the retracted position RP to the extended position EP while simultaneously driving the seatback 26 from the upright position U to the reclined position R. It is further contemplated that a manual crank or lever can be used in place of any electronic powered drive mechanism, such as drive mechanism 70, for adjusting a position of the rear seat 18. Further, the drive mechanism 70 can adjust and retain the seat base 22 to any position between the fore and aft positions shown in FIGS. 2 and 3.

Figure 4:
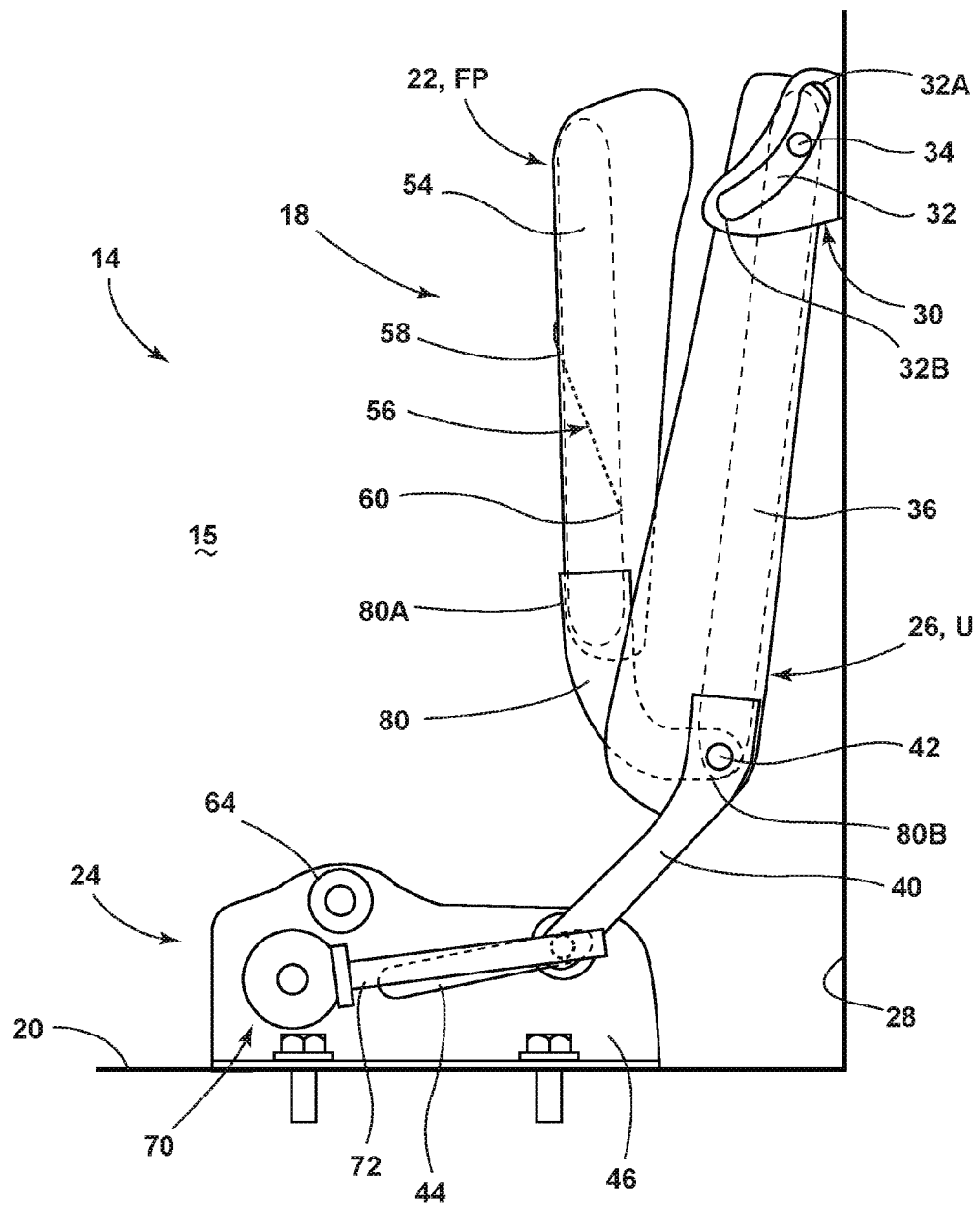
FIG. 4 is a side elevational view of the rear seat of FIG. 2 with a seat base in a folded position.

Referring now to FIG. 4, the seat base 22 is shown in the folded position FP, with the seatback 26 in the upright position U. In this way, the rear seat 18 provides maximized cargo space 15 within the vehicle cabin 14. With the seat base 22 in the folded position FP, it is clear that the seat base 22 is removeably supported on the support bracket 24 at support roller 64. Thus, the guide rail 56 of the seat base 22 is supported in an abutting relationship on the support roller 64 for rolling the seat base 22 between the first and second support surfaces 58, 60 as shown in FIGS. 2 and 3. The seat base 22 is coupled to the seatback 26 at an attachment bracket 80 which includes a first end 80A coupled to the seat base frame 54, and a second end 80B coupled to the pivot point 42 which is further coupled to a lower portion of the seatback frame 36 and lower bracket 40. Thus, the seat base 22 pivots at pivot point 42 between either of the use positions UP, shown in FIGS. 2 and 3, and the folded position FP shown in FIG. 4. It is further contemplated that a lock mechanism disposed at or near pivot point 42 is used to retain the seat base 22 in the folded position FP until the lock mechanism is selectively released by a user to rotate the seat base 22 from the folded position FP to a use position UP.

Referring now to FIG. 5, support bracket 24 is shown having the upright portion 46 and an anchor portion 47, wherein the anchor portion 47 is secured to a support surface 20, such as a vehicle floor, via attachment means such as bolts 82. In the embodiment shown in FIG. 5, a second support bracket 24A is shown spaced-apart from support bracket 24, such that the rear seat 18 may be supported at the seat base 22 thereof on a support roller 64 spanning the distance between two aligned support brackets 24, 24A in an upright bracket system which is mounted to support surface 20. In use, the support roller 64 is configured to freely rotate in a forward and rearward direction as indicated by arrow R1 as the seat base 22 moves between the extended and retracted positions as shown in FIGS. 2 and 3. As shown in FIG. 5, support bracket 24A includes upright portion 46A having guide slot 44C disposed therein having first and second ends 44D, 44E. As such, it is contemplated that an attachment bracket, similar to lower bracket 40 shown in FIGS. 2 and 3, is disposed on the right side of the rear seat 18 for coupling the seatback 26 with guide slot 44C using a guide pin similar to guide pin 48. In this way, both sides of the rear seat 18 will be coupled to parallel support brackets 24, 24A for guiding movement of the rear seat 18 between upright and reclined positions.

Figure 6:
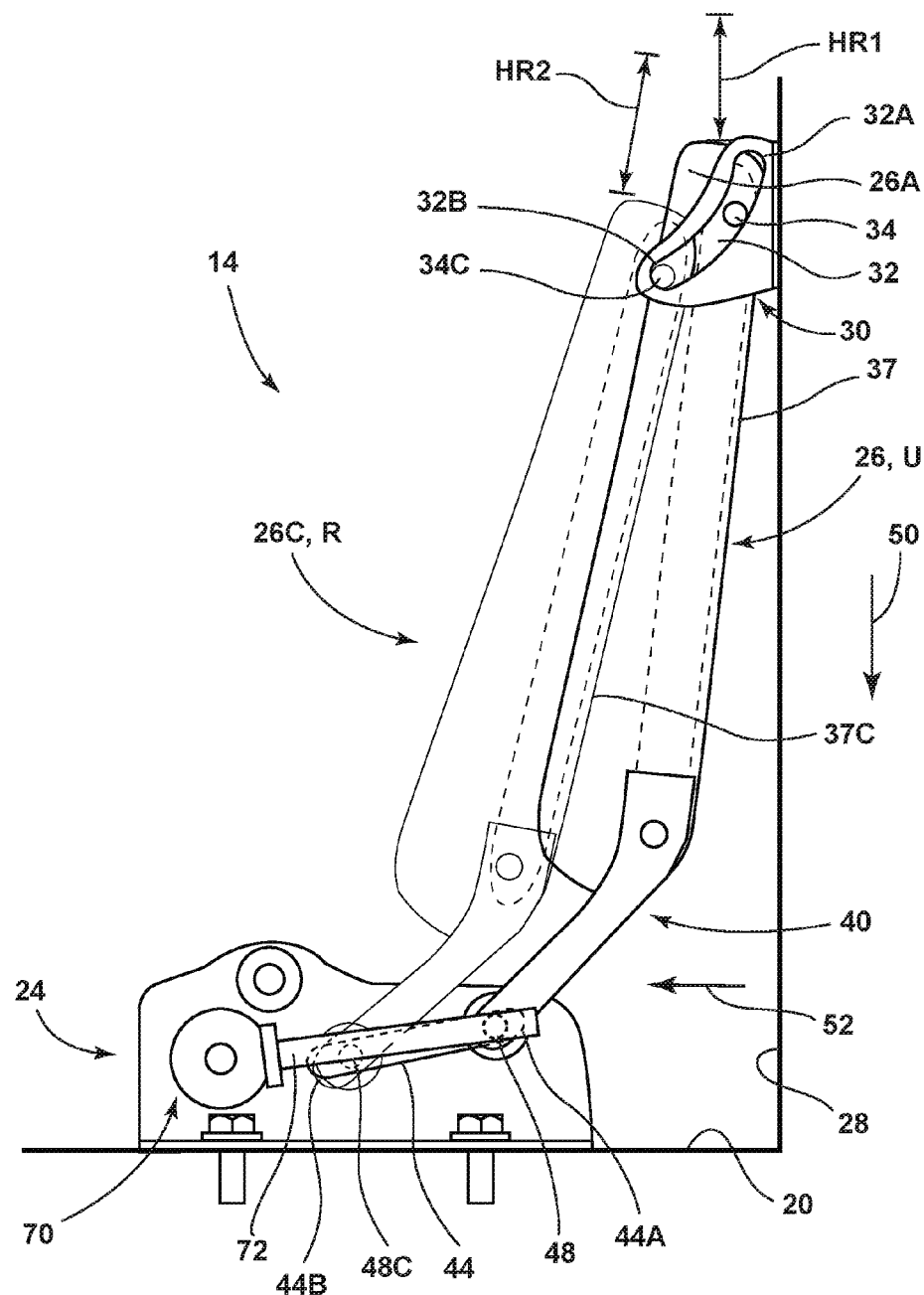
FIG. 6 is a side elevational view of a seatback shown in both upright and reclined positions relative to the support bracket of FIG. 5.

Referring now to FIG. 6, the seatback 26 is shown in an upright position U as well as in a reclined position R. In FIG. 6, the positions of the seatback 26 are specifically shown as seatback 26 in the upright position U, and seatback 26C being shown in the reclined position R. In this embodiment, seatback 26 is the same as seatback 26C, however, seatbacks 26 and 26C are both shown in FIG. 6 to directly compare the upright and reclined positions U, R of the seatback 26 in use. With seatback 26 in the upright position U, a rearmost portion 37 of the seatback is disposed adjacent to rear wall 28 of the vehicle cabin 14. In this position, guide pin 34 is disposed near first end 32A of guide slot 32 of upper bracket 30. In the reclined position R, seatback 26C is shown having the guide pin 34C moved downward and outward towards the second end 32B along guide slot 32. In this way, the rearmost portion 37C of seatback 26C has moved downward in the direction as indicated by arrow 50 and outward as indicated by arrow 52. The outward movement in the direction as indicated by arrow 52 provides for the rearmost portion 37C of the seatback 26C to be moved away from the rear wall 28 when the seatback 26C is in the reclined position R. Further, upper portion 26A moves outward and downward in a car-forward direction away from rear wall 28, as compared to a static pivoting action found in other reclining systems. This movement allows for a dedicated amount of headroom space HR1 associated with seatback 26 to move downward and outward to the headroom space HR2 associated with seatback 26C. Thus, as the rear seat 18 moves from the upright position U to the reclined position R, the space dedicated for headroom HR2 is moved downward and away from the rear wall 28, such that the amount of headroom available between HR1 and HR2 is unaffected.

As further shown in FIG. 6, the guide pin 48 disposed within guide slot 44 of support bracket 24 moves from the first end 44A of guide slot 44 to the second end 44B of guide slot 44. Thus, seatback 26C includes guide pin 48C shown disposed adjacent to second end 44B of the guide slot 44 in the reclined position R. With seatback 26 in the upright position U, and seatback 26C in the reclined position R, FIG. 6 shows two positions for the seatback 26 at opposite sides of a range of movement for the seatback 26. It is contemplated that the drive mechanism 70 can move the seatback 26 to any position between the upright position U and reclined position R by manipulating the position of the guide pin 48 along guide slot 44 using the drive shaft 72.

Figure 7:
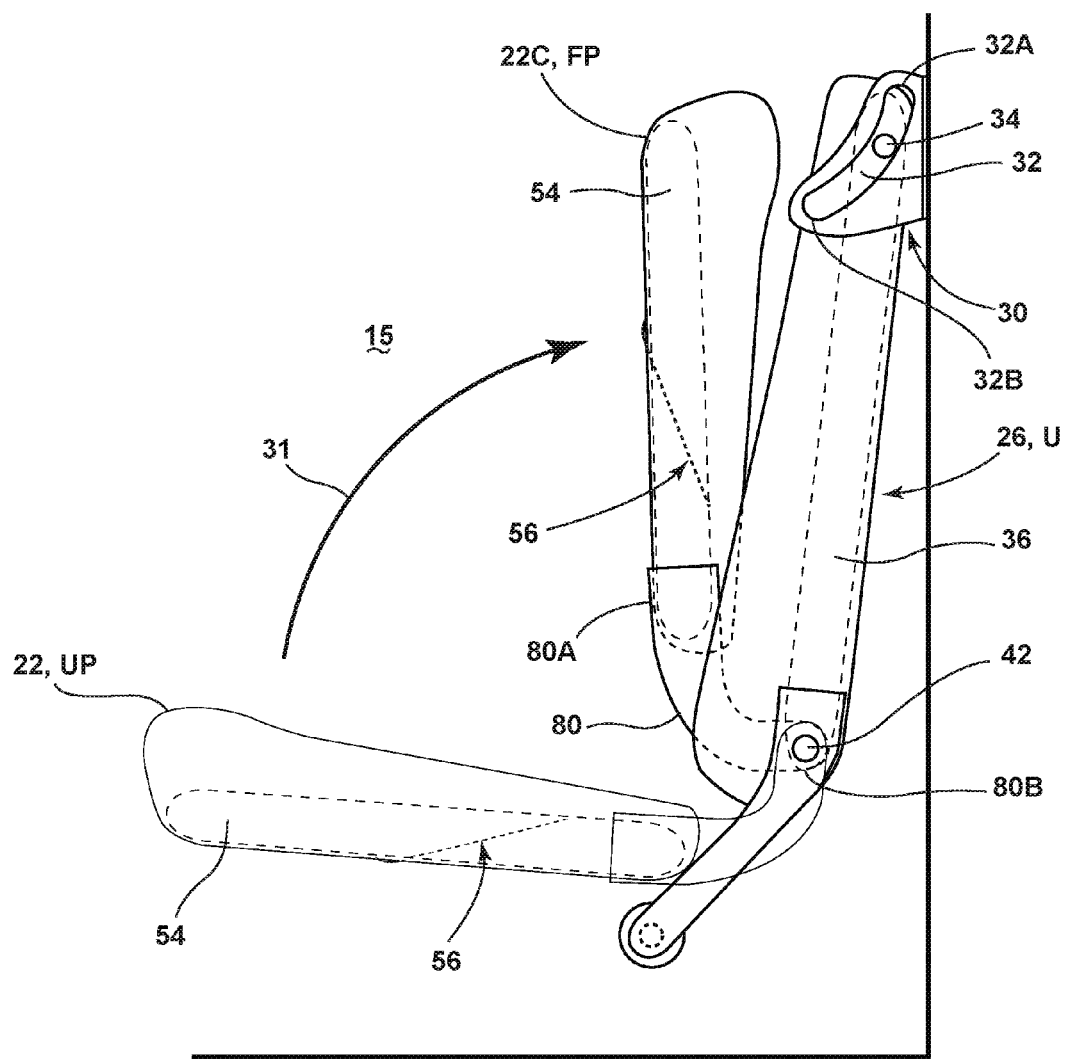
FIG. 7 is a side elevational view of the rear seat of FIG. 2 showing the seat base in both use and folded positions.

Referring now to FIG. 7, the seat base 22 is shown in both a deployed use position UP as well as a stowed or folded position FP. In FIG. 7, the positions of the seat base 22 are specifically shown as seat base 22 in the use position UP, and seat base 22C being shown in the folded position FP. In this embodiment, seat base 22 is the same as seat base 22C, however, seat base 22 and seat base 22C are both shown in FIG. 8 to directly compare the deployed and stowed positions of the seat base 22 in use. Seat base 22 is moved from the use position UP to the folded position FP by pivoting or rotation the seat base 22 along the path as indicated by arrow 31 which pivots at pivot point 42 of the pivoting connection between the seat base 22 and the seatback 26.

Figure 8:
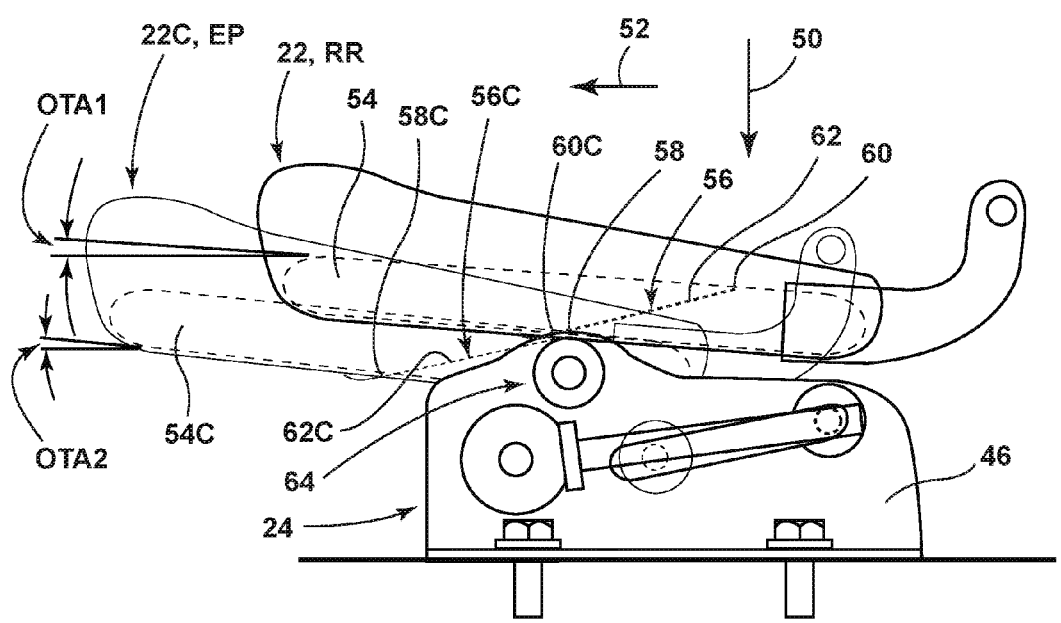
FIG. 8 is a side elevational view showing the seat base of FIG. 7 in both extended and retracted positions relative to the support bracket of FIG. 5.

Referring now to FIG. 8, the seat base 22 is shown in both an extended position EP as well as a retracted position RP. In FIG. 8, the positions of the seat base 22 are specifically shown as seat base 22 in the retracted position RP, and seat base 22C being shown in the extended position EP. In this embodiment, seat base 22 is the same as seat base 22C, however, seat base 22 and seat base 22C are both shown in FIG. 8 to directly compare the fore and aft or extended and retracted positions EP, RP of the seat base 22 in use. With seat base 22 in the retracted position RP, the seat base 22 is supported on the first support surface 58 of the guide rail 56. With seat base 22C in the extended position EP, the seat base 22C is supported on the second support surface 60C of the guide rail 56C. Thus, in moving from the retracted position RP to the extended position EP, the seat base 22 has moved downward and outward as indicated by arrows 50, 52, respectively. Seat base 22 defines an occupant thigh angle OTA1, that varies minimally as compared to occupant thigh angle OTA2 for seat base 22C in the extended position EP. This is due to the configuration of the guide rail 56 having first and second support surfaces 58, 60 disposed at varying vertical heights V1, V2 as shown in FIG. 2. As the configuration of the guide rail 56 rides along the support roller 64 throughout the fore and aft motion of the seat base 22, the occupant thigh angle is minimally changed from OTA1 to OTA2 and vice versa. This too adds to the overall occupant comfort in using the reclining feature of the rear seat 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A reclining seat, comprising:
   a seat base coupled to a support surface by one or more upstanding brackets, wherein the seat base is moveable between fore and aft positions on the one or more upstanding brackets; and
   a seatback coupled at an upper portion thereof to a rear wall, wherein the rear wall prevents rearward reclining movement of the seatback, wherein the seatback includes at least one upper guide pin member disposed in a guide slot of an upper bracket coupled to the rear wall, wherein a lower portion of the seatback includes at least one lower guide pin that is coupled to a guide slot of the one or more upstanding brackets, and further wherein the seatback is operable between upright and reclined positions.

2. The reclining seat of claim 1, wherein the seat base is pivotally coupled to the seatback, and further wherein the seatback moves to the reclined position as the seat base moves to the fore position.

3. The reclining seat of claim 2, wherein the seat base is further operable between a use position and a folded position.

4. The reclining seat of claim 3, wherein the seat base is rotated upward from the use position to the folded position.

5. The reclining seat of claim 1, wherein the seat base is supported on a support roller disposed on the one or more upstanding brackets between the fore position and the aft position.

6. The reclining seat of claim 1, wherein the guide slot of the upper bracket includes a downwardly and outwardly curved configuration.

7. The reclining seat of claim 6, wherein a rearmost portion of the seatback moves outwardly away from the rear wall when the seatback moves from the upright position to the reclined position.

8. The reclining seat of claim 1, wherein the guide slot of the one or more upstanding brackets includes a downwardly angled configuration in a car-forward direction.

9. The reclining seat of claim 8, wherein a rearmost portion of the seatback moves outwardly away from the rear wall when the seatback moves from the upright position to the reclined position.

10. A reclining seat, comprising:
a seat base having a guide rail disposed on an underside thereof, wherein the guide rail includes first and second support surfaces having a ramped portion disposed therebetween;
an upright bracket system having a support roller, wherein the guide rail contacts the support roller to support the seat base between extended and retracted positions; and
a seatback, wherein the seatback is moved to a reclined position when the seat base is moved to the extended position.

11. The reclining seat of claim 10, wherein the seatback is moved to an upright position when the seat base is moved to the retracted position.

12. The reclining seat of claim 10, wherein the ramped portion is disposed at an upward angle from the first support surface to the second support surface.

13. The reclining seat of claim 12, wherein the seat base is supported on the support roller at the first support surface of the guide rail when the seat base is in the retracted position, and further wherein the seat base is supported on the support roller at the second support surface of the guide rail when the seat base is in the extended position.

14. The reclining seat of claim 10, wherein the seat base is pivotally coupled to a seatback between use and folded positions.

15. A reclining seat, comprising:
a support roller;
a seat base supported on the support roller between extended and retracted positions along a guide rail, wherein the guide rail includes first and second support surfaces, the first support surface disposed at a first height and the second support surface disposed at a second height that is greater than the first height; and
a seatback coupled to the seat base and operable between upright and reclined positions.

16. The reclining seat of claim 15, wherein the seat base is rotatable to an upright folded position relative to the seatback.

17. The reclining seat of claim 15, wherein the seat base is supported on the support roller at the first support surface of the guide rail when the seat base is in the retracted position.

18. The reclining seat of claim 17, wherein the seat base is supported on the support roller at the second support surface of the guide rail when the seat base is in the extended position.

19. The reclining seat of claim 15, wherein an upper portion of the seatback moves in a car-forward and downward direction as the seatback moves from the upright position to the reclined position.

* * * * *